United States Patent
Tang

(10) Patent No.: US 8,825,381 B2
(45) Date of Patent: Sep. 2, 2014

(54) NAVIGATION SYSTEM WITH SINGLE INITIATION MECHANISM AND METHOD OF OPERATION THEREOF

(75) Inventor: Ky Tang, Milpitas, CA (US)

(73) Assignee: Telenav, Inc., Sunnyvale, CA (US)

( * ) Notice: Subject to any disclaimer, the term of this patent is extended or adjusted under 35 U.S.C. 154(b) by 713 days.

(21) Appl. No.: 12/536,470

(22) Filed: Aug. 5, 2009

(65) Prior Publication Data

US 2011/0035142 A1 Feb. 10, 2011

(51) Int. Cl.
*G01C 21/36* (2006.01)

(52) U.S. Cl.
CPC .................................. *G01C 21/3617* (2013.01)
USPC .......................................... 701/424; 701/538

(58) Field of Classification Search
USPC .......................................................... 701/200
See application file for complete search history.

(56) References Cited

U.S. PATENT DOCUMENTS

| | | | |
|---|---|---|---|
| 6,385,535 B2 * | 5/2002 | Ohishi et al. | 701/427 |
| 6,405,126 B1 * | 6/2002 | Palomo et al. | 701/428 |
| 6,487,495 B1 | 11/2002 | Gale et al. | |
| 6,542,812 B1 | 4/2003 | Obradovich et al. | |
| 6,600,994 B1 * | 7/2003 | Polidi | 701/533 |
| 6,662,105 B1 * | 12/2003 | Tada et al. | 701/420 |
| 6,801,909 B2 | 10/2004 | Delgado et al. | |
| 6,988,035 B2 * | 1/2006 | Slickers | 701/410 |
| 7,233,861 B2 | 6/2007 | Van Buer et al. | |
| 7,260,474 B1 * | 8/2007 | Thayathil et al. | 701/428 |
| 7,574,661 B2 * | 8/2009 | Matsuura et al. | 715/745 |
| 7,623,962 B1 | 11/2009 | Moore et al. | |
| 7,961,114 B2 * | 6/2011 | Mizuno | 340/905 |
| 8,024,112 B2 * | 9/2011 | Krumm et al. | 701/423 |
| 2002/0152020 A1 * | 10/2002 | Seibel | 701/208 |
| 2004/0032344 A1 * | 2/2004 | Slickers | 340/995.19 |
| 2004/0098194 A1 | 5/2004 | Baur et al. | |
| 2004/0181334 A1 | 9/2004 | Blumbergs et al. | |
| 2005/0102098 A1 | 5/2005 | Montealegre et al. | |
| 2005/0125148 A1 * | 6/2005 | Van Buer et al. | 701/209 |
| 2005/0143905 A1 * | 6/2005 | Yoshikawa et al. | 701/200 |
| 2006/0004680 A1 | 1/2006 | Robarts et al. | |
| 2006/0156209 A1 | 7/2006 | Matsuura et al. | |
| 2006/0276962 A1 * | 12/2006 | Yoshioka et al. | 701/208 |
| 2007/0010942 A1 * | 1/2007 | Bill | 701/209 |
| 2007/0038372 A1 * | 2/2007 | Kudo et al. | 701/211 |
| 2007/0112475 A1 * | 5/2007 | Koebler et al. | 701/1 |
| 2007/0150174 A1 * | 6/2007 | Seymour et al. | 701/200 |
| 2007/0255493 A1 * | 11/2007 | Ayoub et al. | 701/211 |

(Continued)

FOREIGN PATENT DOCUMENTS

DE 19839378 A1 3/2000

OTHER PUBLICATIONS

International Search Report for Application No. PCT/US2010/044499 dated Oct. 12, 2010.

*Primary Examiner* — Shelley Chen
(74) *Attorney, Agent, or Firm* — IP Investment Law Group

(57) ABSTRACT

A method of operation of a navigation system includes: receiving a single selection for a desired item; generating a destination for the desired item with a prioritization and a learned knowledge of a user's behavior for improving an accuracy of the destination that is generated; and calculating a route to the destination based solely on the single selection for reducing danger from distraction by entering multiple entries and for displaying the route on a device and the single selection is an only entry before displaying the route.

18 Claims, 8 Drawing Sheets

(56) References Cited

U.S. PATENT DOCUMENTS

| | | | |
|---|---|---|---|
| 2008/0021628 A1* | 1/2008 | Tryon | 701/99 |
| 2008/0027639 A1* | 1/2008 | Tryon | 701/209 |
| 2009/0005964 A1* | 1/2009 | Forstall et al. | 701/201 |
| 2010/0036601 A1* | 2/2010 | Ozawa et al. | 701/201 |
| 2010/0094550 A1* | 4/2010 | Tsurutome et al. | 701/209 |
| 2010/0131199 A1* | 5/2010 | Severson | 701/213 |
| 2011/0004523 A1* | 1/2011 | Giuli et al. | 705/14.58 |

\* cited by examiner

NAVIGATION SYSTEM WITH SINGLE INITIATION MECHANISM AND METHOD OF OPERATION THEREOF

TECHNICAL FIELD

The present invention relates generally to a navigation system, and more particularly to a system for navigation system with a one click mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a display of the route to the destination that requires multiple entries by the user, which compromises the user's safety, has become a paramount concern for the consumer. Unsafe operation of the navigation system decreases the benefit of using the tool.

Thus, a need still remains for a navigation system that can display a route more safely. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a single selection for a desired item; generating a destination for the desired item with a prioritization and a learned knowledge of a user's behavior for improving an accuracy of the destination that is generated; and calculating a route to the destination based solely on the single selection for reducing danger from distraction by entering multiple entries and for displaying the route on a device and the single selection is an only entry before displaying the route.

The present invention provides a navigation system, including: a controller interface for receiving a single selection for a desired item; a select destination module, coupled to the controller interface, for generating a destination for the desired item with a prioritization and a learned knowledge of a user's behavior for improving an accuracy of the destination that is generated; and a route engine module, coupled to the select destination module, for calculating a route to the destination based solely on the single selection for reducing danger from distraction by entering multiple entries and for displaying the route on a device and the single selection is an only entry before displaying the route.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
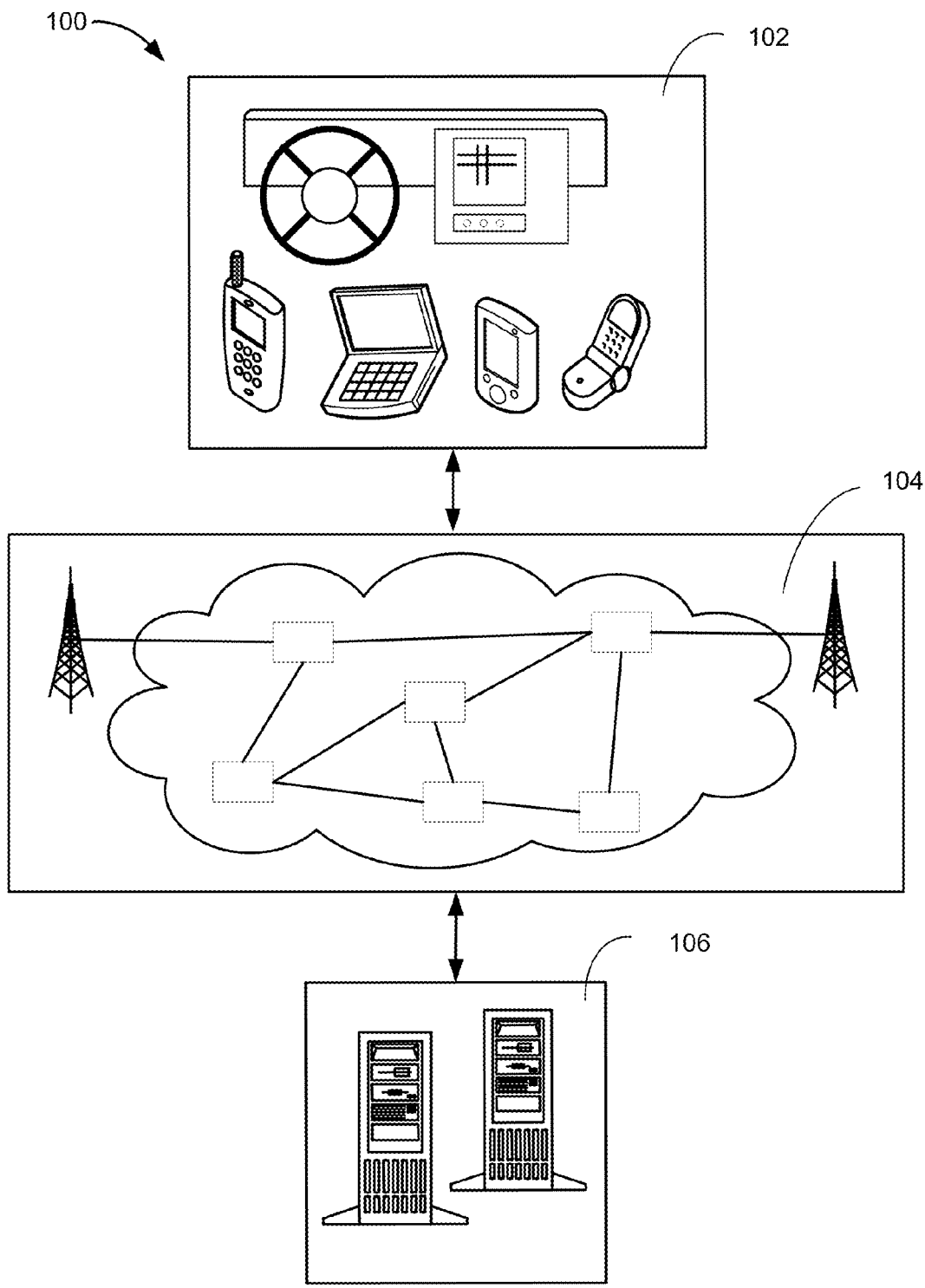
FIG. 1 is a navigation system with single initiation mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown is a navigation system 100 with single initiation mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
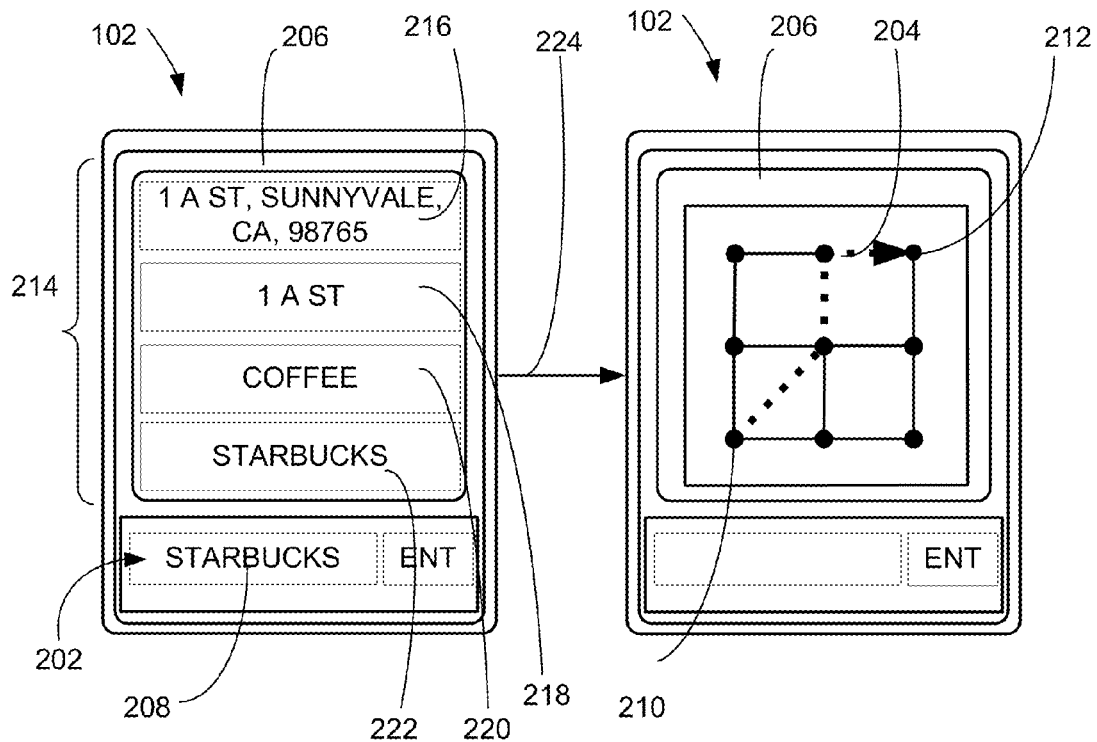
FIG. 2 shows examples of displays on a display interface of the first device.

Referring now to FIG. 2, therein are shown examples of displays on a display interface 206 of the first device 102. A single selection 202, such as a one-click, can be performed by a user to display a route 204 on the display interface 206 of the first device 102 without other entries.

The single selection 202 can be an entry of a desired item 208 into the first device 102. The desired item 208 can represent the content of the entry made for the single selection 202. For example, the desired item 208 can be "Dunkin Donuts," "1600 Pennsylvania," "Thai restaurant," or "5225 Figueroa Mountain Rd., Los Olivos, Calif. 93441" where the single selection 202 is the single entry of "Starbucks."

From the single selection 202, the display interface 206 can display the route 204 from a current location 210 to a destination 212. The destination 212 can represent the specific geographical location of the desired item 208.

For example, the desired item 208 can be categorized into a selection type 214. The selection type 214 can include a full entry 216, a partial entry 218, a category of interest 220, or a keyword 222. The full entry 216 can represent a full address, such as 1 A Street, Sunnyvale, Calif. 98765, which contains complete information for that address. The partial entry 218 can represent a partial address, such as 1 A Street, which contains incomplete information for that address. The category of interest 220 can represent a broad breadth of interests, such as coffee, restaurant, refueling station, or gym. The keyword 222 can represent a brand name, such as Starbucks, Nike, Ace Hardware, or Alta Bates Hospital.

The single selection 202 of the desired item 208 is an only entry 224 into the first device 102. By solely entering the desired item 208 with the single selection 202, the first device 102 can calculate and display the route 204 to the destination 212.

For example, the user can enter "Starbucks" as the only entry 224 for the desired item 208. The first device 102 can calculate the route 204 from the user's current location 210 to the destination 212 where "Starbucks" locates on a specific geographical location. The display interface 206 can display the route 204 for the user without other or intervening entries from the single selection 202.

Figure 3:
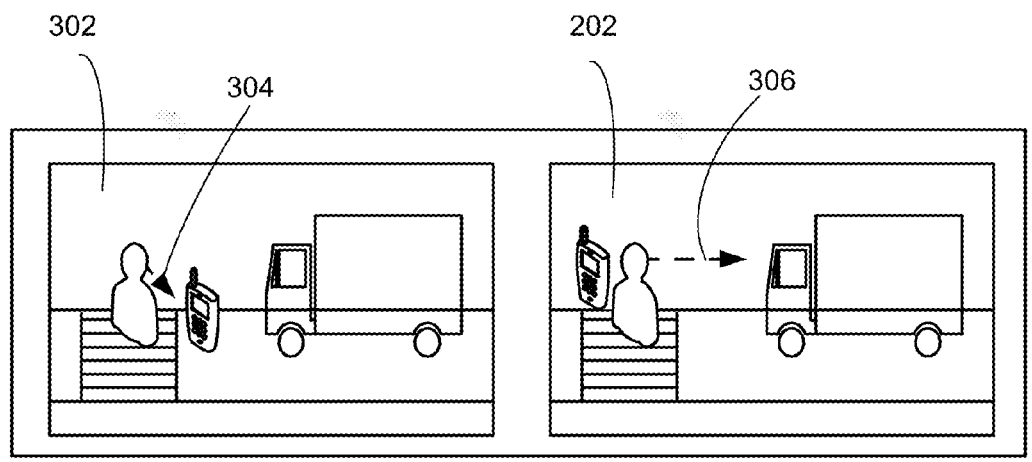
FIG. 3 is an example of the safety benefit of using the navigation system of FIG. 1.

Referring now to FIG. 3, therein is shown an example of the safety benefit of using the navigation system 100 of FIG. 1. Other types of navigation systems that require multiple entries 302 by the user to display a route can create a distraction 304 that can compromise the user's safety. The single selection 202 of FIG. 2 as the only entry 224 of FIG. to the first device 102 of FIG. 1 can improves user's safety by reducing a danger 306 from the distraction 304 of entering the multiple entries 302.

For example, the multiple entries 302 can represent the entries for the desired item 208 into the first device 102 that require more than one entry. The distraction 304 can represent the lack of focus or attention to the surrounding or traffic around the user caused by entering the multiple entries 302 into the first device 102. The reduction of the danger 306 can represent the safety benefit derived from being able to focus or pay attention to the surrounding or traffic surrounding the user from the single selection 202.

For example, the user can enter "Starbucks" as the first entry for a navigation system that requires the multiple entries 302 to calculate a route. In response to the user's first entry, the other navigation system can display a list of Starbucks for the user to select from on the display interface. Based on the subsequent entries required by the user for the selection of a particular Starbucks from the list, the navigation system can calculate and display the route to Starbucks on the display interface.

The subsequent entries performed by the user for the navigation system to calculate the route can be the distraction 304 that compromises the user's safety. For example, while the user is making a second entry, the user's eyes can not on the oncoming or the surrounding traffic, but on the display interface of the other navigation system.

The first device 102 of FIG. 1 can calculate the route 204 of FIG. 2 based on the single selection 202 by the user for the desired item 208 of FIG. 2 as the only entry 224 of FIG. 2. The single selection 202 of the navigation system 100 can protect the user's safety by reducing the danger 306 from the distraction 304 by eliminating the multiple entries 302. For example, by reducing the steps to the single selection 202 for the first device 102 to calculate and display the route 204, the user can pay more attention to the oncoming or surrounding traffic.

Figure 4:
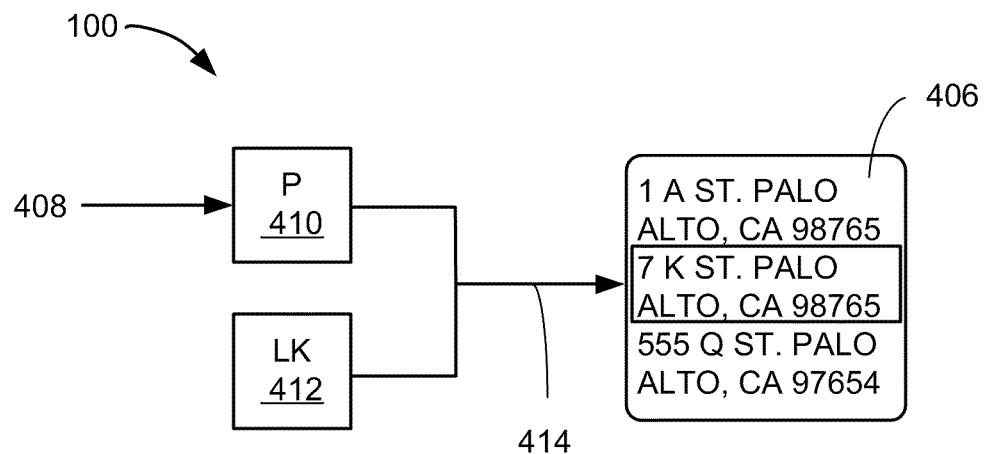
FIG. 4 is an example of improving an accuracy of the navigation system.

Referring now to FIG. 4, therein is shown an example of improving an accuracy 414 of the navigation system 100. The accuracy 414 of the navigation system 100 for selecting the destination 212 of FIG. 2 from potential destinations 406 can be improved by capturing a user's priority 408 and through learning of the usage of the navigation system 100.

The potential destinations 406 can represent candidates of the destination 212 that the navigation system 100 can select from for calculating the route 204 of FIG. 2 for the desired item 208. The potential destinations 406 can be preloaded or manually entered into the navigation system 100.

The navigation system 100 can process the content of a user's priority 408. For example, the user's priority 408 can represent the factors that the user find important in selecting the destination 212 from the potential destinations 406. A prioritization 410 can represent the user's priority 408.

The navigation system 100 can configure and manage the prioritization 410. The prioritization 410 can represent specific individual factors defined within the navigation system 100 by the user or the navigation system 100 for selecting the destination 212. For example, the prioritization 410 can be the least amount of traffic and the shortest driving distance. The navigation system 100 can select the destination 212 from the potential destinations 406 based on the prioritization 410.

The navigation system 100 can also populate and manage a learned knowledge 412. For example, the learned knowledge 412 can represent the information regarding the user's pattern of activity collected and learned by the navigation system 100. For example, the user visits client A after lunch. The navigation system 100 can factor in the user's pattern of activity for selecting the destination 212 from the potential destinations 406. The learned knowledge 412 can be required by the navigation system 100 to base the selection of the destination 212 from the potential destinations 406.

For example, the user can enter "Starbucks," the keyword 222 of FIG. 2, as the single selection 202 for the desired item 208. The navigation system 100 can have three candidates for the potential destinations 406 to select from to calculate the route 204. The navigation system 100 can improve the accuracy 414 of the selection of the destination 212 from the potential destinations 406 by factoring the prioritization 410 and the learned knowledge 412 to narrow the selection.

For example, without the prioritization 410 and the learned knowledge 412, the navigation system 100 may not accurately choose the destination 212 which the user prefers just from the keyword 222. Without the prioritization 410 and the learned knowledge 412, the navigation system 100 may not have the information to choose one candidate over another from the potential destinations 406.

Based on the prioritization 410 and the learned knowledge 412, the navigation system 100 can accurately select "7 K Street, Palo Alto, Calif. 98765" as the destination 212 from the potential destinations 406. The Starbucks at "7 K Street, Palo Alto, Calif. 98765" can be a Starbucks that is closest from client A. Based on the accuracy 414 in selecting the destination 212, the navigation system 100 can calculate the route 204 to the destination 212 which the user most prefers.

Figure 5:
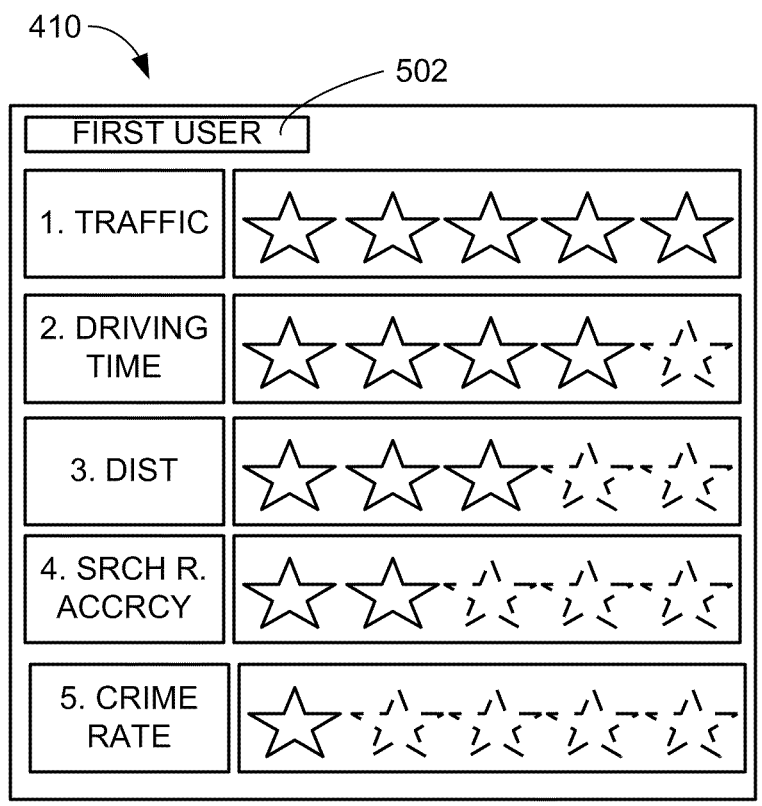
FIG. 5 is an example of the prioritization.

Referring now to FIG. 5, therein is shown an example of the prioritization 410. This example can be a visual display of the user setting up the prioritization 410 on the display interface 206 of FIG. 2. For example, the user can choose "Traffic" as a top priority for the prioritization 410 of FIG. 4 by selecting five stars. Additionally, the user can choose "Crime" Rate" as a low priority for the prioritization 410 by selecting one star.

The stars can indicate the degree of importance, which the ranking of the prioritization 410 is based on. For example, the degree of importance can be based on the number of stars that are outlined with solid lines. In this example, "Traffic" has five solid outlined stars and "Crime Rate" has one solid outlined stars. The user can set "Traffic" as a higher priority than "Crime Rate" for selecting the destination 212 of FIG. 2 from the potential destinations 406 of FIG. 4.

The navigation system 100 can configure and manage the prioritization 410 according to a user profile 502. For example, the navigation system 100 can configure and manage the prioritization 410 for the user profile 502 for a first user, second user, or the combination thereof.

For example, the prioritization 410 can represent the priorities for the first user. The first user or the navigation system 100 itself can rank the prioritization 410 from the most important to least important as the following: 1. Traffic; 2. Driving Time; 3. Distance; 4. Search Result Accuracy; and 5. Crime Rate.

From the potential destinations 406, the navigation system 100 can base the selection of the destination 212 that comes closest to fulfilling or meeting the priorities defined in the prioritization 410. For example, the navigation system 100 can select "7 K Street, Palo Alto, Calif. 98765", as the selected destination 212 required the least amount of traffic and the driving time from the current location 210 of FIG. 2.

Figure 6:
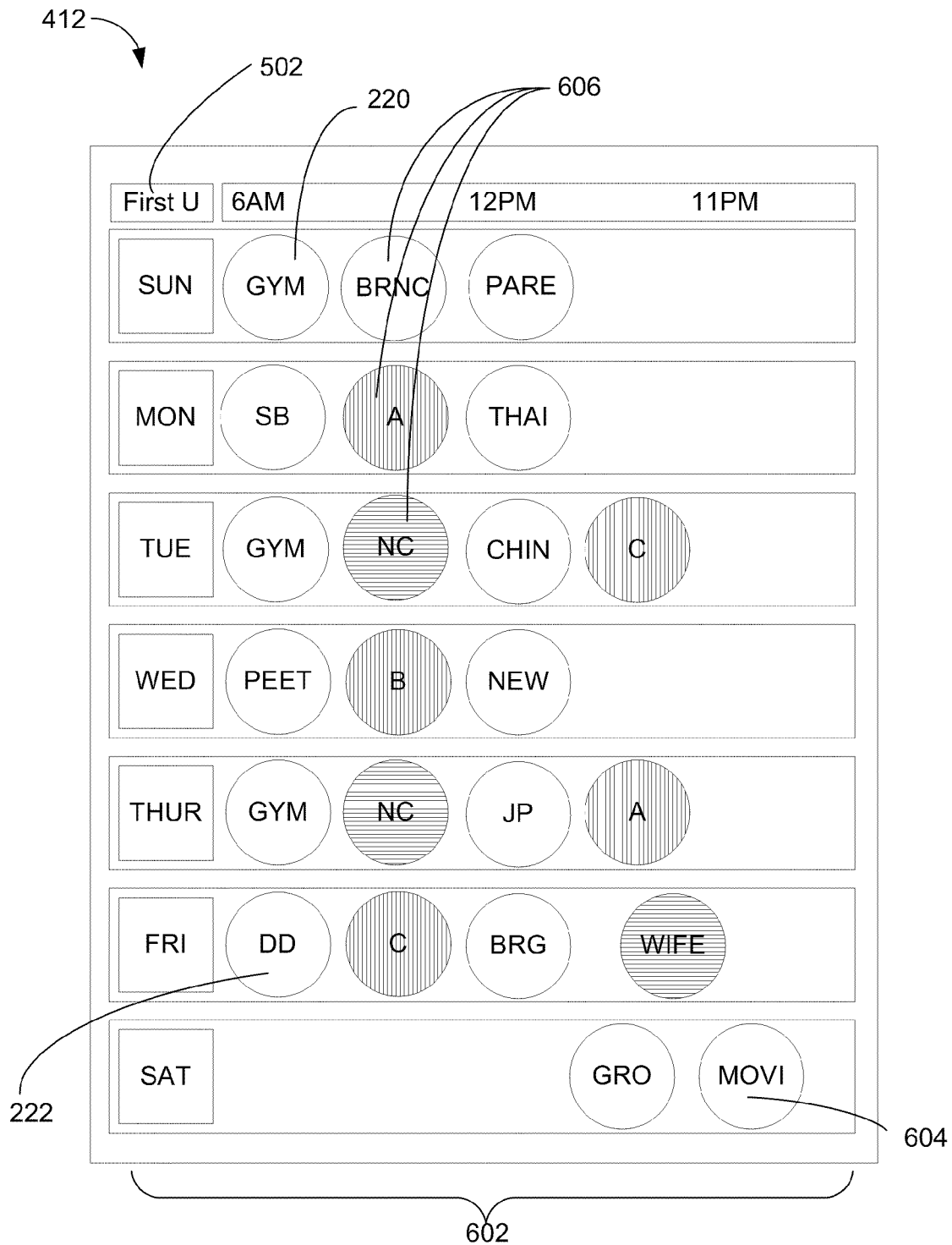
FIG. 6 is an example of the learned knowledge.

Referring now to FIG. 6, therein is shown an example of the learned knowledge 412. The user can view what has been learned by the navigation system 100 on the display interface 206 of FIG. 2.

The navigation system 100 can populate and manage the learned knowledge 412 according to the user profile 502 of FIG. 5. For example, the learned knowledge 412 can represent a weekly schedule of the first user.

The user's weekly schedule can include a user's behavior 602. For example, the user's behavior 602 can depict the user's pattern of activity for each day of the week. In this example, the user drinks coffee at Starbucks on Monday mornings, at Peets Coffee on Wednesday mornings, and at Dunkin Donuts on Friday mornings. Additionally, the user takes his wife out for dinner on Friday evenings.

The user's weekly schedule can include a preference 604. For example, the preference 604 can depict the user's predilection of doing certain activity during a certain time of the day. In this example, the user prefers to go out for a movie on Saturday nights.

The navigation system 100 can factor a reprioritization 606 of the user's priority 408 of FIG. 4 to improve the quality of the learned knowledge 412. For example, the reprioritization 606 can define or redefine the priority for collecting and learning the information by the navigation system 100 for the user's behavior 602.

The stripes in the circles can indicate the degree of importance defined by the reprioritization 606. For example, no stripe can indicate a low level of importance. A vertical stripe can indicate a medium level of importance. And the horizontal stripe can indicate a high level of importance.

For example, the first user goes for brunch on Sundays, visits client A on Mondays, and visits new clients on Tuesdays. The user or the navigation system 100 can set the reprioritization 606 for brunch at a low level, because the user frequents the same restaurant for brunch. The user or the navigation system 100 can realize that no new collection or learning of the information, such as the level of traffic or driving time, regarding this activity is required.

The reprioritization 606 for client A can be set at a medium level, because client A is an important client. Therefore, the learned knowledge 412 can be updated more frequently than brunch by collecting and learning the information consistently.

The reprioritization 606 for the new clients can be set at a high level, because the navigation system 100 does not have or have minimal learned knowledge 412 for the new clients. Therefore, the learned knowledge 412 can be collected and updated at all times to build the learned knowledge 412 for the new clients.

Figure 7:
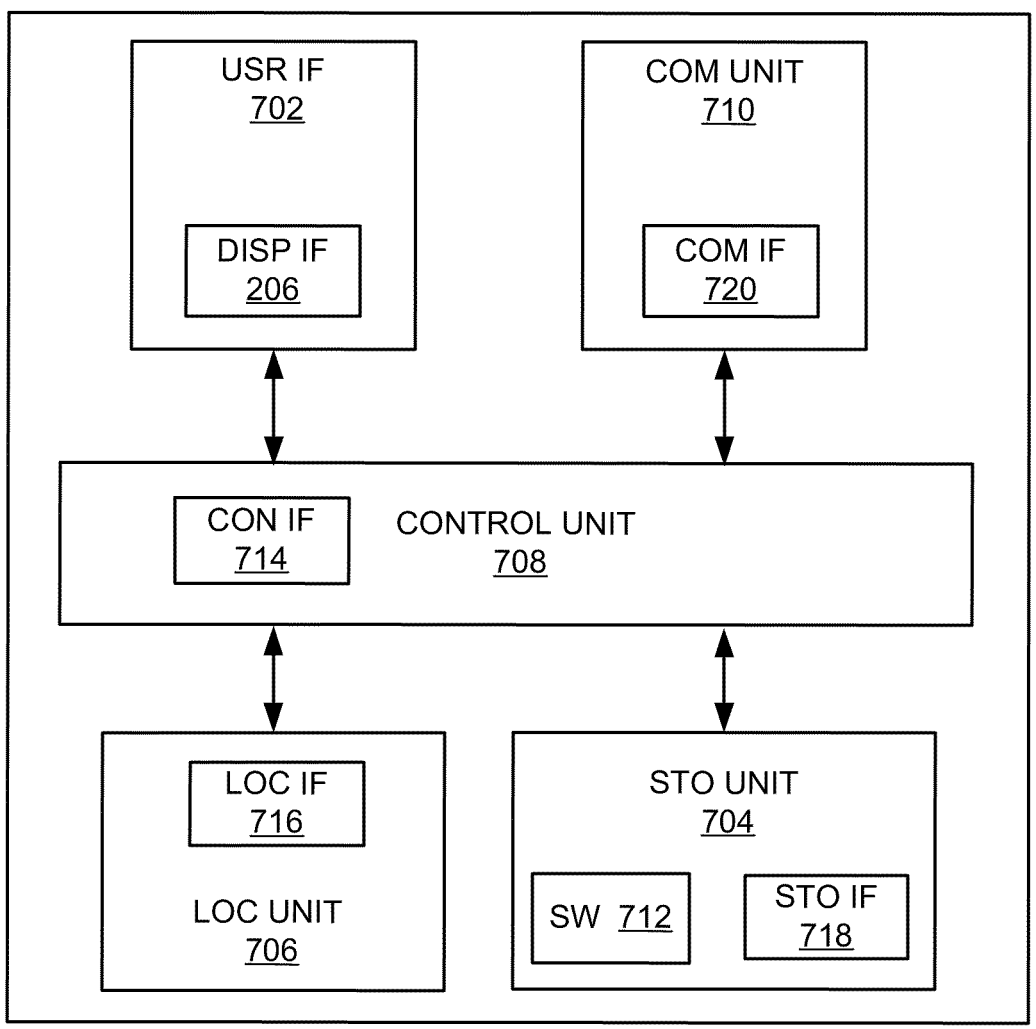
FIG. 7 is an exemplary block diagram of the first device.

Referring now to FIG. 7, therein is shown an exemplary block diagram of the first device 102. The first device 102 can include a user interface 702, a storage unit 704, a location unit 706, a control unit 708, and a communication unit 710.

The user interface 702 allows a user (not shown) to interface and interact with the first device 102. The user interface 702 can include an input device and an output device. Examples of the input device of the user interface 702 can include a keypad, a touchpad, soft-keys, a keyboard, a microphone, or any combination thereof to provide data and communication inputs. Examples of the output device of the user interface 702 can include the display interface 206 of FIG. 2. The display interface 206 can include a display, a projector, a video screen, a speaker, or any combination thereof.

The control unit 708 can execute a software 712 to provide the intelligence of the navigation system 100. The control unit 708 can operate the user interface 702 to display information generated by the navigation system 100. The control unit 708 can also execute the software 712 for the other functions of the navigation system 100, including receiving location information from the location unit 706. The control unit 708 can further execute the software 712 for interaction with the communication path 104 of FIG. 1 via the communication unit 710.

The control unit 708 can be implemented in a number of different manners. For example, the control unit 708 can be a processor, an embedded processor, a microprocessor, a hardware control logic, a hardware finite state machine (FSM), a digital signal processor (DSP), or a combination thereof.

The control unit 708 can include a controller interface 714. The controller interface 714 can be used for communication between the control unit 708 and other functional units in the first device 102. The controller interface 714 can also be used for communication that is external to the first device 102.

The controller interface 714 can receive information from the other functional units or from external sources, or can transmit information to the other functional units or to external destinations. The external sources and the external destinations refer to sources and destinations external to the first device 102.

The controller interface 714 can be implemented in different ways and can include different implementations depending on which functional units or external units are being interfaced with the controller interface 714. For example, the controller interface 714 can be implemented with a pressure sensor, an inertial sensor, a microelectromechanical system (MEMS), optical circuitry, waveguides, wireless circuitry, wireline circuitry, or a combination thereof.

The location unit 706 can generate location information, current heading, and current speed of the first device 102, as examples. The location unit 706 can be implemented in many ways. For example, the location unit 706 can function as at least a part of a global positioning system (GPS), an inertial navigation system, a cell-tower location system, a pressure location system, or any combination thereof.

The location unit 706 can include a location interface 716. The location interface 716 can be used for communication between the location unit 706 and other functional units in the first device 102. The location interface 716 can also be used for communication that is external to the first device 102.

The location interface 716 can receive information from the other functional units or from external sources, or can transmit information to the other functional units or to external destinations. The external sources and the external destinations refer to sources and destinations external to the first device 102.

The location interface 716 can include different implementations depending on which functional units or external units are being interfaced with the location unit 706. The location interface 716 can be implemented with technologies and techniques similar to the implementation of the controller interface 714.

The storage unit 704 can store the software 712. The storage unit 704 can also store the relevant information, such as advertisements, points of interest (POI), navigation routing entries, or any combination thereof.

The storage unit 704 can be a volatile memory, a nonvolatile memory, an internal memory, an external memory, or a combination thereof. For example, the storage unit 704 can be a nonvolatile storage such as non-volatile random access memory (NVRAM), Flash memory, disk storage, or a volatile storage such as static random access memory (SRAM).

The storage unit 704 can include a storage interface 718. The storage interface 718 can be used for communication between the location unit 706 and other functional units in the first device 102. The storage interface 718 can also be used for communication that is external to the first device 102.

The storage interface 718 can receive information from the other functional units or from external sources, or can transmit information to the other functional units or to external destinations. The external sources and the external destinations refer to sources and destinations external to the first device 102.

The storage interface 718 can include different implementations depending on which functional units or external units are being interfaced with the storage unit 704. The storage interface 718 can be implemented with technologies and techniques similar to the implementation of the controller interface 714.

The communication unit 710 can enable external communication to and from the first device 102. For example, the communication unit 710 can permit the first device 102 to communicate with the second device 106 of FIG. 1, an attachment, such as a peripheral device or a computer desktop, and the communication path 104.

The communication unit 710 can also function as a communication hub allowing the first device 102 to function as part of the communication path 104 and not limited to be an end point or terminal unit to the communication path 104. The communication unit 710 can include active and passive components, such as microelectronics or an antenna, for interaction with the communication path 104.

The communication unit 710 can include a communication interface 720. The communication interface 720 can be used for communication between the communication unit 710 and other functional units in the first device 102. The communication interface 720 can receive information from the other functional units or can transmit information to the other functional units.

The communication interface 720 can include different implementations depending on which functional units are being interfaced with the communication unit 710. The communication interface 720 can be implemented with technologies and techniques similar to the implementation of the controller interface 714.

For illustrative purposes, the navigation system 100 is shown with the partition having the user interface 702, the storage unit 704, the location unit 706, the control unit 708, and the communication unit 710 although it is understood that the navigation system 100 can have a different partition. For example, the software 712 can be partitioned differently such that some or all of its function can be in the control unit 708, the location unit 706, and the communication unit 710. Also, the first device 102 can include other functional units not shown in FIG. 7 for clarity.

The functional units in the first device 102 can work individually and independently of the other functional units. The first device 102 can work individually and independently from the second device 106 and the communication path 104.

Figure 8:
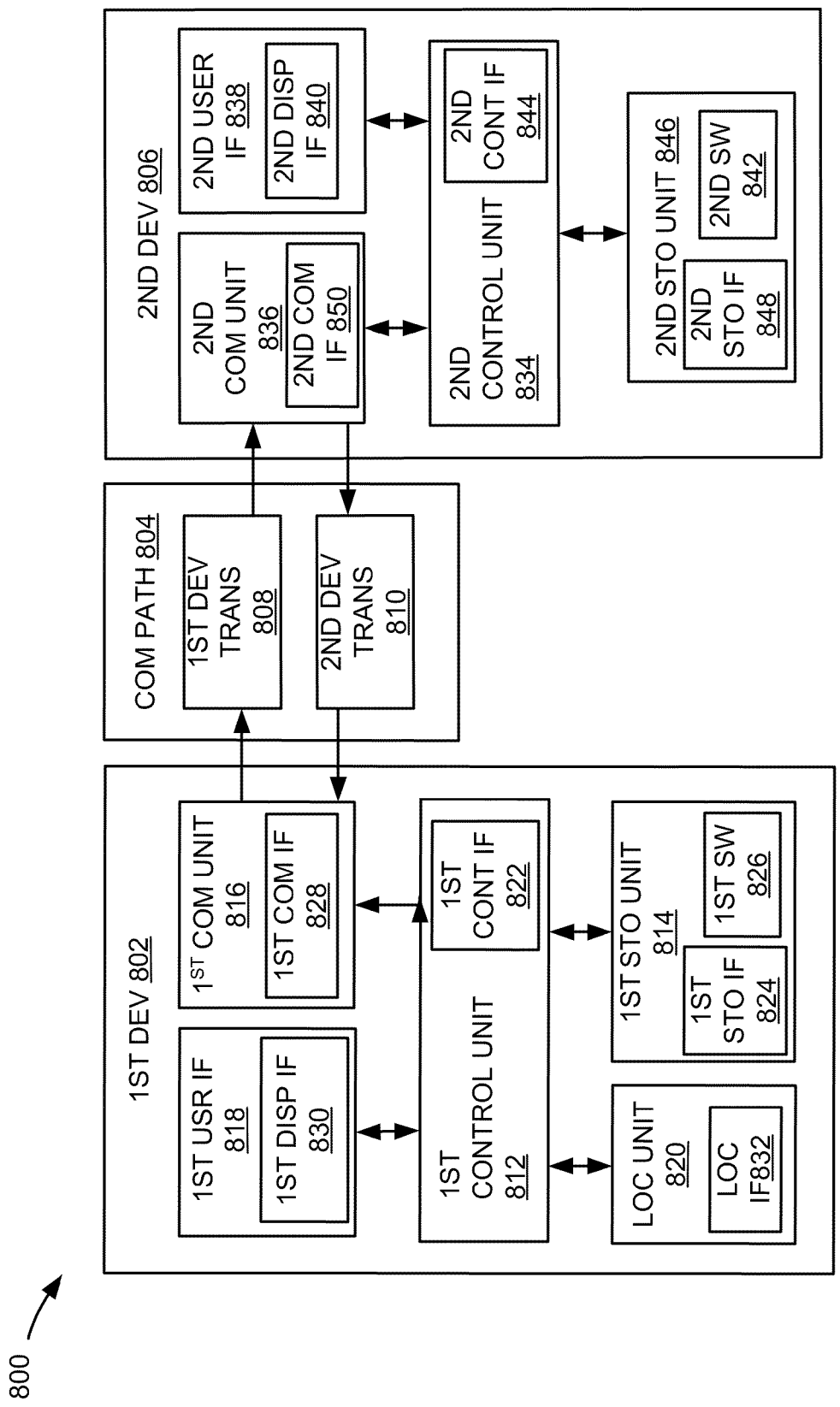
FIG. 8 is an exemplary block diagram of a navigation system with single initiation mechanism in a second embodiment of the present invention.

Referring now to FIG. 8, therein is an exemplary block diagram of a navigation system 800 with single initiation mechanism in a second embodiment of the present invention. The navigation system 800 can include a first device 802, a communication path 804, and a second device 806.

The first device 802 can communicate with the second device 806 over the communication path 804. For example, the first device 802, the communication path 804, and the second device 806 can be the first device 102 of FIG. 1, the communication path 104 of FIG. 1, and the second device 106 of FIG. 1, respectively. The screen shot shown on the display interface 206 described in FIG. 2 can represent the screen shot for the navigation system 800.

The first device 802 can send information in a first device transmission 808 over the communication path 804 to the second device 806. The second device 806 can send information in a second device transmission 810 over the communication path 804 to the first device 802.

For illustrative purposes, the navigation system 800 is shown with the first device 802 as a client device, although it is understood that the navigation system 800 can have the first device 802 as a different type of device. For example, the first device 802 can be a server.

Also for illustrative purposes, the navigation system 800 is shown with the second device 806 as a server, although it is understood that the navigation system 800 can have the second device 806 as a different type of device. For example, the second device 806 can be a client device.

For brevity of description in this embodiment of the present invention, the first device 802 will be described as a client device and the second device 806 will be described as a server device. The present invention is not limited to this selection for the type of devices. The selection is an example of the present invention.

The first device 802 can include a first control unit 812, a first storage unit 814, a first communication unit 816, a first user interface 818, and a location unit 820. The first device 802 can be similarly described by the first device 102.

The first control unit 812 can include a first control interface 822. The first control unit 812 and the first control interface 822 can be similarly described as the control unit 708 of FIG. 7 and the controller interface 714 of FIG. 7, respectively.

The first storage unit 814 can include a first storage interface 824. The first storage unit 814 and the first storage interface 824 can be similarly described as the storage unit 704 of FIG. 7 and storage interface 718 of FIG. 7, respectively. A first software 826 can be stored in the first storage unit 814.

The first communication unit 816 can include a first communication interface 828. The first communication unit 816 and the first communication interface 828 can be similarly described as the communication unit 710 of FIG. 7 and the communication interface 720 of FIG. 7, respectively.

The first user interface 818 can include a first display interface 830. The first user interface 818 and the first display interface 830 can be similarly described as the user interface 702 of FIG. 7 and the display interface 206 of FIG. 7, respectively.

The location unit 820 can include a location interface 832. The location unit 820 and the location interface 832 can be similarly described as the location unit 706 of FIG. 7 and the location interface 716 of FIG. 7, respectively.

The performance, architectures, and type of technologies can also differ between the first device 102 and the first device 802. For example, the first device 102 can function as a single device embodiment of the present invention and can have a higher performance than the first device 802. The first device 802 can be similarly optimized for a multiple device embodiment of the present invention.

For example, the first device 102 can have a higher performance with increased processing power in the control unit 708 compared to the first control unit 812. The storage unit 704 can provide higher storage capacity and access time compared to the first storage unit 814.

Also for example, the first device 802 can be optimized to provide increased communication performance in the first communication unit 816 compared to the communication unit 710. The first storage unit 814 can be sized smaller compared to the storage unit 704. The first software 826 can be smaller than the software 712 of FIG. 7.

The second device 806 can be optimized for implementing the present invention in a multiple device embodiment with the first device 802. The second device 806 can provide the additional or higher performance processing power compared to the first device 802. The second device 806 can include a second control unit 834, a second communication unit 836, and a second user interface 838.

The second user interface 838 allows a user (not shown) to interface and interact with the second device 806. The second user interface 838 can include an input device and an output device. Examples of the input device of the second user interface 838 can include a keypad, a touchpad, soft-keys, a keyboard, a microphone, or any combination thereof to provide data and communication inputs. Examples of the output device of the second user interface 838 can include a second display interface 840. The second display interface 840 can include a display, a projector, a video screen, a speaker, or any combination thereof.

The second control unit 834 can execute a second software 842 to provide the intelligence of the second device 106 of the navigation system 800. The second software 842 can operate in conjunction with the first software 826. The second control unit 834 can provide additional performance compared to the first control unit 812 or the control unit 708.

The second control unit 834 can operate the second user interface 838 to display information. The second control unit 834 can also execute the second software 842 for the other functions of the navigation system 800, including operating the second communication unit 836 to communicate with the first device 802 over the communication path 804.

The second control unit 834 can be implemented in a number of different manners. For example, the second control unit 834 can be a processor, an embedded processor, a microprocessor, a hardware control logic, a hardware finite state machine (FSM), a digital signal processor (DSP), or a combination thereof.

The second control unit 834 can include a second controller interface 844. The second controller interface 844 can be used for communication between the second control unit 834 and other functional units in the second device 806. The second controller interface 844 can also be used for communication that is external to the second device 806.

The second controller interface 844 can receive information from the other functional units or from external sources, or can transmit information to the other functional units or to external destinations. The external sources and the external destinations refer to sources and destinations external to the second device 806.

The second controller interface 844 can be implemented in different ways and can include different implementations depending on which functional units or external units are being interfaced with the second controller interface 844. For example, the second controller interface 844 can be implemented with a pressure sensor, an inertial sensor, a microelectromechanical system (MEMS), optical circuitry, waveguides, wireless circuitry, wireline circuitry, or a combination thereof.

A second storage unit 846 can store the second software 842. The second storage unit 846 can also store the relevant information, such as advertisements, points of interest (POI), navigation routing entries, or any combination thereof. The second storage unit 846 can be sized to provide the additional storage capacity to supplement the first storage unit 814.

For illustrative purposes, the second storage unit 846 is shown as a single element, although it is understood that the second storage unit 846 can be a distribution of storage elements. Also for illustrative purposes, the navigation system 800 is shown with the second storage unit 846 as a single hierarchy storage system, although it is understood that the navigation system 800 can have the second storage unit 846 in a different configuration. For example, the second storage unit 846 can be formed with different storage technologies forming a memory hierarchal system including different levels of caching, main memory, rotating media, or off-line storage.

The second storage unit 846 can be a volatile memory, a nonvolatile memory, an internal memory, an external memory, or a combination thereof. For example, the second storage unit 846 can be a nonvolatile storage such as nonvolatile random access memory (NVRAM), Flash memory, disk storage, or a volatile storage such as static random access memory (SRAM).

The second storage unit 846 can include a second storage interface 848. The second storage interface 848 can be used for communication between the location unit 706 and other functional units in the second device 806. The second storage interface 848 can also be used for communication that is external to the second device 806.

The second storage interface 848 can receive information from the other functional units or from external sources, or can transmit information to the other functional units or to external destinations. The external sources and the external destinations refer to sources and destinations external to the second device 806.

The second storage interface 848 can include different implementations depending on which functional units or external units are being interfaced with the second storage unit 846. The second storage interface 848 can be implemented with technologies and techniques similar to the implementation of the second controller interface 844.

The second communication unit 836 can enable external communication to and from the second device 806. For example, the second communication unit 836 can permit the second device 806 to communicate with the first device 802 over the communication path 804.

The second communication unit 836 can also function as a communication hub allowing the second device 806 to function as part of the communication path 804 and not limited to be an end point or terminal unit to the communication path

804. The second communication unit 836 can include active and passive components, such as microelectronics or an antenna, for interaction with the communication path 804.

The second communication unit 836 can include a second communication interface 850. The second communication interface 850 can be used for communication between the second communication unit 836 and other functional units in the second device 806. The second communication interface 850 can receive information from the other functional units or can transmit information to the other functional units.

The second communication interface 850 can include different implementations depending on which functional units are being interfaced with the second communication unit 836. The second communication interface 850 can be implemented with technologies and techniques similar to the implementation of the second controller interface 844.

The first communication unit 816 can couple with the communication path 804 to send information to the second device 806 in the first device transmission 808. The second device 806 can receive information in the second communication unit 836 from the first device transmission 808 of the communication path 804.

The second communication unit 836 can couple with the communication path 804 to send information to the first device 802 in the second device transmission 810. The first device 802 can receive information in the first communication unit 816 from the second device transmission 810 of the communication path 804. The navigation system 800 can be executed by the first control unit 812, the second control unit 834, or a combination thereof.

For illustrative purposes, the second device 106 is shown with the partition having the second user interface 838, the second storage unit 846, the second control unit 834, and the second communication unit 836, although it is understood that the second device 106 can have a different partition. For example, the second software 842 can be partitioned differently such that some or all of its function can be in the second control unit 834 and the second communication unit 836. Also, the second device 806 can include other functional units not shown in FIG. 8 for clarity.

The functional units in the first device 802 can work individually and independently of the other functional units. The first device 802 can work individually and independently from the second device 806 and the communication path 804.

The functional units in the second device 806 can work individually and independently of the other functional units. The second device 806 can work individually and independently from the first device 802 and the communication path 804.

For illustrative purposes, the navigation system 800 is described by operation of the first device 802 and the second device 806. It is understood that the first device 802 and the second device 806 can operate any of the modules and functions of the navigation system 800. For example, the first device 802 is described to operate the location unit 820, although it is understood that the second device 806 can also operate the location unit 820.

Figure 9:
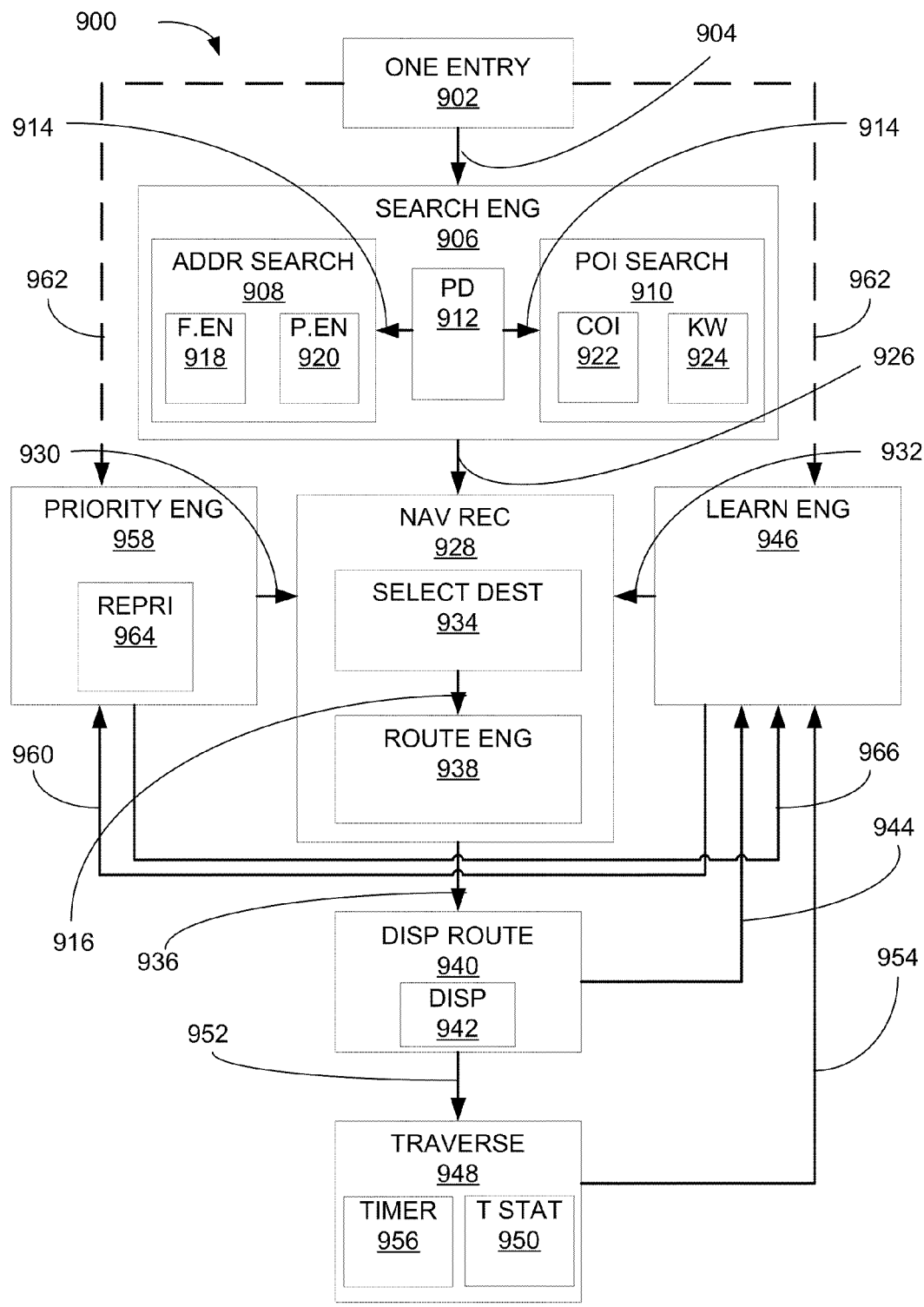
FIG. 9 is a navigation system with single initiation mechanism in a third embodiment of the present invention.

Referring now to FIG. 9, therein is a navigation system 900 with single initiation mechanism in a third embodiment of the present invention. The navigation system 900 can include a one entry module 902. The one entry module 902 receives the user's entry for the navigation system 900 to calculate and display a route to the target destination. For example, the one entry module 902 can receive a single selection 904 for the desired item 208 of FIG. 2. The single selection 904 can represent the single selection 202 of FIG. 2.

The one entry module 902 can receive the single selection 904 for the desired item 208 in a number of ways. For example, the one entry module 902 can receive a manually typed entry, a selection from a list, a voice entry, or the combination thereof.

The one entry module 902 can receive the single selection 904 for the desired item 208 in a variety of selection type 214 of FIG. 2. For example, the single selection 904 can be the full entry 216 of FIG. 2, the partial entry 218 of FIG. 2, the category of interest 220 of FIG. 2, the keyword 222 of FIG. 2, or the combination thereof.

The entry of the single selection 904 into the one entry module 902 is the only entry 224 of FIG. 2 made by the user before the route 204 of FIG. 2 is displayed, as described in FIG. 3. Other navigation systems that require multiple entries 302 of FIG. 3 by the user to display a route can create distraction 304 of FIG. 3 that can compromise the user's safety. The single selection 904 of the navigation system 900 can improve the user's safety by reducing the danger 306 of FIG. 3 from distraction 304 of entering the multiple entries 302.

The navigation system 900 can include a search engine module 906. The search engine module 906 identifies the type of selection that the user entered for the single selection 904. For example, the search engine module 906 can recognize the single selection 904 as the full entry 216, the partial entry 218, the category of interest 220, the keyword 222, or the combination thereof.

The search engine module 906 can identify the selection type 214 to the single selection 904 in a number of ways. For example, the search engine module 906 can include an address search module 908, a point of interest search module 910, and a potential destinations module 912.

The potential destinations module 912 can store potential destinations 914. The potential destinations 914 can represent the potential destinations 406 of FIG. 4. The potential destinations module 912 can initially be populated by preloading the data, by user manually entering the data, or the combination thereof. For example, the user can upload the address information of the United States from a data file, such as a CD or DVD, into the potential destinations module 912.

The address search module 908 can verify whether the single selection 904 provided complete or incomplete information for the address. Based on the verification, the address search module 908 can determine whether the single selection 904 can be the full entry 216 or the partial entry 218.

For example, the user can enter "1600 Pennsylvania Ave" as the single selection 904 for the desired item 208. The address search module 908 can search the potential destinations module 912 to find whether any of the potential destinations 914 have "1600 Pennsylvania Ave" as the address or a part of the address.

In this example, "1600 Pennsylvania Ave" does not provide a State or zip code information. The full entry 216 can include complete information of the address. For example, 1600 Pennsylvania Ave NW Washington, D.C. 20006 can be the full entry 216.

The address search module 908 can verify that "1600 Pennsylvania Ave" is the partial entry 218, as the potential destinations module 912 can have multiple potential destinations 914 with addresses containing "1600 Pennsylvania Ave" as part of the address. Based on the verification, the address search module 908 can identify the selection type 214 of the partial entry 218 to the single selection 904.

For further example, the user can enter "1600 Pensylvania Ave" as the single selection 904 for the desired item 208. Unlike the previous example, the user can misspell the desired item 208. The address search module 908 can search the potential destinations module 912 to find the potential destinations 914 that match closest to "1600 Pensylvania Ave." The address search module 908 can distinguish that "1600 Pennsylvania Ave" can be the closest match to "1600 Pensylvania Ave." Based on the determination of "1600 Pensylvania Ave" as "1600 Pennsylvania Ave," the address search module 908 can identify the selection type 214 of the partial entry 218 for the misspelled entry of the single selection 904.

The search engine module 906 can filter the potential destinations 914 based on the selection type 214 to narrow the selection of a destination 916. The destination 916 can represent the destination 212 of FIG. 2. For example, the address search module 908 can include a full entry module 918 and a partial entry module 920. The full entry module 918 can filter the potential destinations 914 to generate a list of destinations that are relevant to the single selection 904 for the full entry 216. The partial entry module 920 can filter the potential destinations 914 to generate a list of destinations that are relevant to the single selection 904 for the partial entry 218.

The search engine module 906 can filter the potential destinations 914 based on the selection type 214 in a number of ways. For example, the potential destinations module 912 can have numerous potential destinations 914 unrelated to "1600 Pennsylvania Ave." From the previous example, the selection type 214 for the single selection 904 was determined to be the partial entry 218. Based on the selection type 214, the partial entry module 920 can filter the potential destinations 914 that are irrelevant to "1600 Pennsylvania Ave." The partial entry module 920 can generate filtered potential destinations 926 that include all potential destinations 914 for "1600 Pennsylvania Ave."

For illustrative purposes, the navigation system 900 is described with the search engine module 906 identifying the selection type 214 of the full entry 216 or the partial entry 218 to the single selection 202, although it is understood that the navigation system 900 can operate the search engine module 906 differently. For example, the search engine module 906 can include the point of interest search module 910. The point of interest search module 910 can verify whether the single selection 904 is the category of interest 220 or the keyword 222. Based on the verification, the point of interest search module 910 can identify the selection type 214 of the category of interest 220 or the keyword 222 to the single selection 904.

For example, the user can enter "Starbucks" as the single selection 904 for the desired item 208. The point of interest search module 910 can search the potential destinations module 912 to find whether any of the potential destinations 914 have "Starbucks" as part of the information. In this example, "Starbucks" can be part of the category of interest 220 for "coffee." The point of interest search module 910 can distinguish "Starbucks" from other potential destinations 914 that belongs to the category of interest 220 for "coffee."

For example, although other coffee shops, such as Peets Coffee or Dunkin Donuts, can belong to the category of interest 220 for "coffee," the potential destinations 914 for Peets Coffee or Dunkin Donuts do not have information related to "Starbucks." Based on the unique identification of "Starbucks," the point of interest search module 910 can identify the selection type 214 of the keyword 222 to the single selection 904 instead of the category of interest 220.

For further example, the user can enter "Starbucs" as the single selection 904 for the desired item 208. Unlike the previous example, the user can misspell the desired item 208. The point of interest search module 910 can search the potential destinations module 912 to find the potential destinations 914 that match closest to "Starbucs." The point of interest search module 910 can distinguish that "Starbucks" can be the closest match to "Starbucs." Based on the determination of "Starbucs" as "Starbucks," the point of interest search module 910 can identify the selection type 214 of the keyword 222 for the misspelled entry of the single selection 904.

For illustrative purposes, the navigation system 900 is described with the search engine module 906 filtering the potential destinations 914 for the single selection 904 of the full entry 216 or the partial entry 218, although it is understood that the navigation system 900 can operate the search engine module 906 differently. For example, the search engine module 906 can filter the potential destinations 914 for the single selection 904 that is the category of interest 220 or the keyword 222.

The point of interest search module 910 can include a category of interest module 922 and a keyword module 924. The category of interest module 922 can filter the potential destinations 914 to generate a list of destinations that are relevant to the single selection 904 for the category of interest 220. The keyword module 924 can filter the potential destinations 914 to generate a list of destinations that are relevant to the single selection 904 for the keyword 222.

For example, the potential destinations module 912 can have numerous potential destinations 914 unrelated to the single selection 904 of "Starbucks." From the previous example, the selection type 214 of the single selection 904 is determined to be the keyword 222. Based on the selection type 214, the keyword module 924 can filter the potential destinations 914 that are irrelevant to "Starbucks." The keyword module 924 can generate the filtered potential destinations 926 that include all potential destinations 914 that contain the unique information related to "Starbucks."

For illustrative purposes, the search engine module 906 is shown having discrete modules, although it is understood that the search engine module 906 can include other modules or modules in different configurations. For example, the address search module 908 and the point of interest search module 910 can be combined. For example, the category of interest module 922 and the keyword module 924 can be combined.

The navigation system 900 can include a navigation recommendation module 928. The navigation recommendation module 928 generates a destination from a list of potential destinations by factoring user's priorities and user's learned behavior. For example, the navigation recommendation module 928 can generate the destination 916 for the desired item 208 from the filtered potential destinations 926 with a prioritization 930 and a learned knowledge 932. The prioritization 930 can represent the prioritization 410 of FIG. 5. The learned knowledge 932 can represent the learned knowledge 412 of FIG. 6.

The navigation recommendation module 928 can generate the destination 916 in a number of ways. For example, the navigation recommendation module 928 can include a select destination module 934. The select destination module 934 can select the destination 916 from the filtered potential destinations 926 by factoring the prioritization 930 and the learned knowledge 932.

For example, the user entered "Starbucks" for the desired item 208 in FIG. 4. The point of interest search module 910 can generate three filtered potential destinations 926 from the potential destinations 914 in FIG. 4. As described in FIG. 5, the prioritization 930 can indicate the amount of traffic, driving time, distance from the current location 210 of FIG. 2, search result accuracy, and the crime rate of the area as the priority factors for the user in choosing the destination 916.

As shown in FIG. 6, the learned knowledge 932 can indicate that the user visits client A on Thursday afternoons. As described in FIG. 4, based on the prioritization 930 and the learned knowledge 932, the select destination module 934 can select "7 K Street, Palo Alto, Calif. 98765" out of the three filtered potential destinations 926. The select destination module 934 can generate that "Starbucks" at "7 K Street, Palo Alto, Calif. 98765" as the destination 916 with the closest and with the least amount of traffic from client A. As described in FIG. 4, the select destination module 934 can improve the accuracy 414 of FIG. 4 of generating the destination 916 that the user most prefers by factoring the prioritization 930 and the learned knowledge 932 for the selection.

Additionally, the select destination module 934 can generate the destination 916 based on the partial entry 218. As raised in the earlier example, based on the prioritization 930 and the learned knowledge 932, the select destination module 934 can select "1600 Pennsylvania Ave NW Washington, D.C. 20006" for the destination 916 from a list of filtered potential destinations 926.

The navigation recommendation module 928 can calculate a route 936 to the destination 916 only from the user's single entry into the navigation system 900. The route 936 can represent the route 204 of the FIG. 2. For example, the navigation recommendation module 928 can calculate the route 936 to the destination 916 based solely on the single selection 904 for reducing the danger 306 of FIG. 3 from distraction 304 of FIG. 3 that result from entering the multiple entries 302 of FIG. 3.

The navigation recommendation module 928 can calculate the route 936 in a number of ways. For example, the navigation recommendation module 928 can include a route engine module 938. The route engine module 938 can calculate the route 936 based on the destination 916 from the select destination module 934. For example, if the select destination module 934 generated "7 K Street, Palo Alto, Calif. 98765" as the destination 916, the route engine module 938 can calculate the route 936 to that destination 916.

The route engine module 938 can also calculate the route 936 based on the destination 916, the prioritization 930, and the learned knowledge 932. For example, the prioritization 930 can indicate that the amount of traffic, driving time, distance to the destination, search result accuracy, and the crime rate of the area as priorities. The learned knowledge 932 can indicate that the user prefers eating Japanese food for lunch on Thursdays. Based on the prioritization 930 and the learned knowledge 932, the route engine module 938 can calculate the route 936 to the closest "Starbucks" near a Japanese restaurant that has least amount of traffic and that takes the least amount of driving time from client A.

For illustrative purposes, the navigation recommendation module 928 is shown having discrete modules, although it is understood that the navigation recommendation module 928 can include other modules or modules in different configurations. For example, the select destination module 934 and the route engine module 938 can be combined.

The navigation system 900 can include a display route module 940. The display route module 940 can display the route 936 to the destination 916 for the user. The display route module 940 can include a display module 942. The display module 942 can represent the display interface 206 of FIG. 2 of the first device 102 of FIG. 1. The display route module 940 can display the route 936 on the display module 942. The single selection 904 can be the only entry 224 of FIG. 2 to the navigation system 900 before displaying the route 936 on the display module 942 for the user.

The display route module 940 can receive a user's rejection 944 for the route 936 calculated by the navigation system 900. For example, the display route module 940 can receive the user's rejection 944 in a number of ways. For example, the display route module 940 can receive a reject selection entered by the user on the first device 102, a voice entry for rejection received by the first device 102, or the combination thereof. The display route module 940 can send the user's rejection 944 to a learning engine module 946.

For illustrative purposes, the display route module 940 is shown having discrete modules, although it is understood that the display route module 940 can include other modules or modules in different configurations. For example, the display module 942 can be integrated into the display route module 940.

The navigation system 900 can include a traverse module 948. The traverse module 948 can track whether the user actually reached the destination 916 or abandoned the route 936.

For example, the traverse module 948 can track the user in a number of ways. The traverse module 948 can include a traverse status module 950. For example, if the user did not reject the route 936 on the display route module 940, the display route module 940 can send a non-rejected route 952 to the traverse module 948. The non-rejected route 952 can represent the status of the user not rejecting the route 936 calculated by the navigation recommendation module 928. Additionally, if the user reaches the destination 916 following the route 936, the traverse module 948 can record the information regarding the user's travel on the route 936 in the traverse status module 950.

The traverse status module 950 can record a traverse status 954 regarding the user's travel in a number of ways. The traverse status module 950 can record whether the user followed the route 936 or used a different route to reach the destination 916.

The traverse status module 950 can record the traverse status 954 regarding the abandonment of the route 936. For example, the traverse status module 950 can track when and where the user strayed off from the route 936. The traverse status module 950 can record the final destination, different from the destination 916, to track the user's travel.

The traverse module 948 can include a timer module 956. The timer module 956 can track the time it took for the user to reach the destination. The timer module 956 can track the time in a number of ways. For example, if the user fails to reach the destination 916 by certain defined time, the traverse module 948 can conclude that the user abandoned the route 936. The traverse status module 950 can record the time tracked by the timer module 956.

The traverse module 948 can receive entries for modification or cancellation of the route 936. For example, the traverse module 948 can receive the entries in a number of ways. For example the traverse module 948 can receive the modification or the cancellation entered by the user on the first device 102, a voice entry for modification or cancellation received by the first device 102, or the combination thereof. The traverse status module 950 can record the modification or cancellation as part of the traverse status 954. The traverse status module 950 can send the traverse status 954 to the learning engine module 946.

The timer module 956 can allow the user to set a count-down timer for the cancellation or the modification. For example, the user can preset the count-down timer as 30 seconds. The traverse module 948 can give an opportunity with a preset time limitation for the user to accept, modify, or cancel the route 936.

For illustrative purposes, the traverse module 948 is shown having discrete modules, although it is understood that the navigation recommendation module 928 can include other modules or modules in different configurations. For example, the traverse status module 950 and the timer module 956 can be combined.

The navigation system 900 can include a priority engine module 958. The priority engine module 958 configures the priorities that the user finds important for the navigation system 900 in calculating the route 936. For example, the priority engine module 958 can configure the prioritization 930.

The priority engine module 958 can configure the prioritization 930 in a number of ways. For example, the priority engine module 958 can create the prioritization 930 through automatic generation based on a preference 960. The preference 960 can represent the preference 604 of FIG. 6.

For example, originally, the user's activities can occur in an area where the crime rate is low. Next, the location of the user's activities can change from an area with a low crime rate to an area with high crime rate. This change in the pattern of activity can change the user's preference 960. The priority engine module 958 can create the prioritization 930 with "Crime Rate" as the top priority in the prioritization 930 to reflect the change in the preference 960.

The priority engine module 958 can create the prioritization 930 manually by the user entering a manual input 962 into the one entry module 902. The priority engine module 958 can receive the manual input 962 that can include the preference 960. The arrow connecting between the one entry module 902 and the priority engine module 958 is dotted. The dotted arrow can represent the different flow steps between the one entry module 902 receiving the single selection 904 and the one entry module 902 receiving the manual input 962, as the two can be mutually exclusive. The one entry module 902 can receive a manually typed entry or a selection from the list for the manual input 962.

For example, the user can enter the manual input 962 that requests raising the priority for the crime rate in the prioritization 930. The priority engine module 958 can raise the priority of the crime rate for the prioritization 930 by moving "Crime Rate" from the bottom of the list to the top of the list to reflect the user's request.

The priority engine module 958 manages the priorities according to the user of the navigation system 900. For example, the priority engine module 958 can manage the prioritization 930 according to the user profile 502.

The priority engine module 958 can manage the prioritization 930 based on the user profile 502 of FIG. 5 in a number of ways. For example, the priority engine module 958 can create the user profile 502 for different users.

The priority engine module 958 can create the prioritization 930 based on the user's usage of the navigation system 900. For example each user can have different priority settings for the navigation system 900. The priority engine module 958 can create the prioritization 930 that reflects individual priority settings. For example, a second user can set the search result accuracy as the top priority. The priority engine module 958 can provide the prioritization 930 to the navigation system 900 according to each user.

The priority engine module 958 can include a reprioritization module 964. The reprioritization module 964 can create a priority for the learning engine module 946 in collecting and learning the information related to the user's behavior 602. For example, the reprioritization module 964 can create a reprioritization 966 of the user's priority 408 based on the manual input 962 or through the automatic generation. The reprioritization 966 can represent the reprioritization 606 of FIG. 6.

The reprioritization module 964 can create the reprioritization 966 manually by the user entering the manual input 962 into the one entry module 902. For example, the user can enter the manual input 962 that requests raising the priority for collecting information regarding the pattern of activity that involves client B in FIG. 6. The reprioritization module 964 can raise the priority for client B in the reprioritization 966 based on the request. As described in FIG. 6, the stripes in the circle for client B can be horizontal originally. Based on the request, the stripes can be changed to vertical. This change in the stripes can reflect the reprioritization module 964 raising the priority for collecting information related to client B.

Also, the reprioritization module 964 can create the reprioritization 966 automatically based on the preference 960. For example, the user's visits to client C increased. This change in the pattern of activity can reflect the change in the preference 960. Based on the change in the preference 960, the reprioritization module 964 can change the reprioritization 966 for collecting the information regarding the pattern of activity that involves client C. The learning engine module 946 can change the reprioritization 966 similar to changes made for client B.

For illustrative purposes, the priority engine module 958 is shown having discrete modules, although it is understood that the priority engine module 958 can include other modules or modules in different configurations. For example, the reprioritization module 964 can be integrated into the priority engine module 958.

The navigation system 900 can include the learning engine module 946. The learning engine module 946 generates the information for user's behavior by collecting and learning the information regarding the user's pattern of activity. For example, the learning engine module 946 can generate the learned knowledge 932 having the preference 960 based on the user's behavior 602 of FIG. 6 and the reprioritization 966.

The learning engine module 946 can generate the learned knowledge 932 in a number of ways. For example, the learning engine module 946 can generate the learned knowledge 932 based on the reprioritization 966 as described in FIG. 6. The learned knowledge 932 can factor the reprioritization 966 for improving the quality of the learned knowledge 932.

For example, the learning engine module 946 can generate the learned knowledge 932 automatically based on the user's behavior 602. The user's behavior 602 can include the user's rejection 944. The user's rejection 944 can be used to teach the learning engine module 946 when and where the user rejected the route 936 calculated by the navigation system 900. For example, the learning engine module 946 can populate the learned knowledge 932 with the time and the location of the user rejecting the route 936.

The user's behavior 602 can include the traverse status 954. The traverse status 954 can be used to teach the learning engine module 946 whether the user accepted or abandoned the route 936 calculated by the navigation system 900. For example, if the user chose a different route to reach the destination 916, the user's behavior 602 can teach the learning engine module 946 the reasons behind rejecting the route 936. For example, the user chose a different route to stop by a grocery store before reaching the destination 916. The learning engine module 946 can populate the learned knowledge 932 with the information of the different route taken by the user to reach the destination 916.

The multiple routes to reach the destination 916 recorded in the traverse status 954 can teach the learning engine module 946 of the user's preference 960. For example, on Tuesdays, the user can drive straight to home after work. However, on Thursdays, the user can drive to a dry cleaner before heading home. The learning engine module 946 can record the preference 960 as part of the learned knowledge 932 to improve the quality of the learned knowledge 932.

Also, the learning engine module 946 can also generate the learned knowledge 932 based on the manual input 962. For example, the user can manually type in the schedule or select the schedule from the calendar on the navigation system 900 to teach the learning engine module 946 of the user's behavior 602.

The learning engine module 946 manages the collected and learned information of the pattern of activity for each user. For example, the learning engine module 946 can manage the learned knowledge 932 based on the user profile 502.

The learning engine module 946 can manage the learned knowledge 932 based on the user profile 502 in a number of ways. For example, the learning engine module 946 can populate the learned knowledge 932 individually per user. The learning engine module 946 can populate the learned knowledge 932 based on an event. For example, the learned knowledge 932 can be populated on per road trip basis rather than individual driver activity basis.

The physical transformation from calculating the route 936 to the destination solely from the single selection by factoring the prioritization and the learned knowledge results in movement in the physical world, such as people using the first device of FIG. 1, the first device 802 of FIG. 8, vehicles, or the combination thereof, based on the operation of the navigation system 900. As the movement in the physical world occurs, the movement itself creates additional information that is converted back to the prioritization 930 and the learned knowledge 932 for the continued operation of the navigation system 900 and to continue the movement in the physical world.

The software 712 of FIG. 7 can include the navigation system 900. For example, the software 712 can include the search engine module 906, the navigation recommendation module 928, the display route module 940, the traverse module 948, the priority engine module 958, and the learning engine module 946.

The one entry module 902 can represent the user interface 702 of FIG. 7. The single selection 904 for the desired item 208 can be entered or selected into the user interface 702. The control unit 708 of FIG. 7 can execute the software 712 for the search engine module 906 to receive the single selection 904 from the one entry module 902. The control unit 708 can also execute the software 712 to operate the communication unit 710 of FIG. 7 and the location unit 706 of FIG. 7.

The software 712 can be executed to generate the destination 916. The control unit 708 can execute the software 712 to execute the search engine module 906, the priority engine module 958, the learning engine module 946, and the navigation recommendation module 928. The control unit 708 can execute the software 712 to generate the destination 916 based on the single selection 904, the prioritization 930, and the learned knowledge 932.

The control unit 708 can execute the software 712 to calculate the route 936 based on the destination 916. The route 936 can be displayed on the display interface 206.

The manual input 962 for the prioritization 930, the reprioritization 966, and the learned knowledge 932 can be entered or selected into the user interface 702. The control unit 708 can execute the software 712 to execute the priority engine module 958. The control unit 708 can execute the software 712 to create the prioritization 930 based on the manual input 962 or the preference 960. The control unit 708 can execute the software 712 to create the reprioritization 966 based on the manual input 962 or the preference 960.

The control unit 708 can execute the software 712 to execute the learning engine module 946. The control unit 708 can execute the software 712 to generate the learned knowledge 932 based on the manual input 962, the user's behavior 602, or the reprioritization 966.

The navigation system 900 can be partitioned between the first device 802 of FIG. 8 and the second device 806 of FIG. 8. For example, the navigation system 900 can be partitioned into the functional units of the first device 802, the second device 806, of a combination thereof. The navigation system 900 can also be implemented as additional functional units in the first device 102 of FIG. 1, the first device 802, the second device 806, or a combination thereof.

As another example, the navigation system 900 can be partitioned between the first software 826 of FIG. 8 and the second software 842 of FIG. 8. For example, the second software 842 can include the search engine module 906, the navigation recommendation module 928, the priority engine module 958, and the learning engine module 946. The second control unit 834 of FIG. 8 can execute the modules partitioned on the second software 842.

The first software 826 can include the display route module 940 and the traverse module 948. Based on the size of the first storage unit 814 of FIG. 8, the first software 826 can include additional modules of the navigation system 900. The first control unit 812 of FIG. 8 can execute the modules partitioned on the first software 826.

The single selection 904 can be entered or selected into first user interface 818 of FIG. 8. The first control unit 812 can operate the first communication unit 816 of FIG. 8 to send the single selection 904 to the second device 806.

The second communication unit 836 of FIG. 8 can send the route 936 to the first device 802 through the communication path 804 of FIG. 8. The route 936 can be displayed on the first display interface 830. The route 936 can be displayed on the second device 106 of FIG. 1.

It has been discovered that the present invention provides a navigation system for providing a route to the destination based solely on a single entry by factoring the user's priorities and behavior. The navigation system can calculate a route to the destination based solely on a single entry for reducing danger from distraction by entering multiple entries. The navigation system can calculate a route to the destination, which the user finds most preferable, solely from an input of a partial entry. The navigation system can calculate a route to the destination, which the user finds most preferable, solely from an input of a keyword or a category of interest. The calculation can be performed by factoring the priorities defined by the user and learned knowledge of user's behaviors.

The navigation system 900 describes the module functions or order as an example. The modules can be partitioned differently. Each of the modules can operate individually and independently of the other modules.

Figure 10:
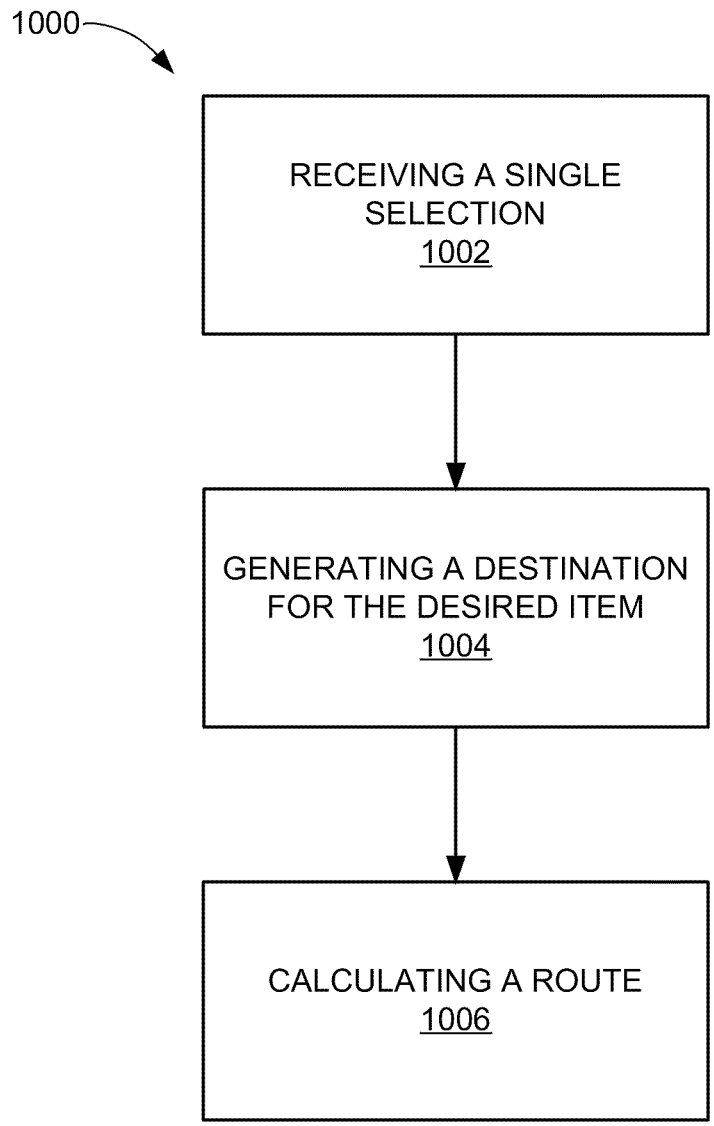
FIG. 10 is a flow chart of a method of operation of a navigation system in a further embodiment of the present invention.

Referring now to FIG. 10, therein is shown a flow chart of a method 1000 of operation of a navigation system 100 in a further embodiment of the present invention. The method 1000 includes: receiving a single selection for a desired item in a block 1002; generating a destination for the desired item with a prioritization and a learned knowledge of a user's behavior for improving an accuracy of the destination that is generated in a block 1004; and calculating a route to the destination based solely on the single selection for reducing danger from distraction by entering multiple entries and for displaying the route on a device and the single selection is an only entry before displaying the route in a block 1006.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   receiving a single selection for a desired item with the single selection for representing a one-click performed by a user;
   generating a destination for the desired item with a prioritization and a learned knowledge for representing a pattern of user's collected activities for improving an accuracy of the destination generated;
   calculating a route to the destination based on the single selection for displaying the route on a device using the single selection without other entries for the desired item or for the route before displaying the route; and
   creating a reprioritization based on a change in the pattern for the user's activities, the reprioritization for controlling a frequency of collecting and updating information for the learned knowledge.

2. The method as claimed in claim 1 wherein creating the reprioritization includes setting a level for collecting and updating information based on a minimal threshold for the learned knowledge or based on a frequency for representing the user's activity.

3. The method as claimed in claim 1 further comprising:
   receiving a preference of the user's behavior;
   creating the prioritization based on the preference; and
   generating the learned knowledge based on the prioritization.

4. The method as claimed in claim 1 further comprising:
   receiving a user's rejection for the route; and
   generating the learned knowledge based on the user's rejection.

5. A method of operation of a navigation system comprising:
   receiving a preference for representing a user;
   creating a prioritization based on the preference;
   generating a learned knowledge based on the prioritization for representing a pattern of user's collected activities;
   receiving a single selection for a desired item with the single selection for representing a one-click performed by a user;
   generating a destination for the desired item with the prioritization and the learned knowledge for improving an accuracy of the destination generated;
   calculating a route to the destination based on the single selection for displaying the route on a device using the single selection without other entries for the desired item or for the route before displaying the route;
   receiving a user's rejection for the route;
   creating a reprioritization based on a change in the pattern for the user's activities, the reprioritization for controlling a frequency of collecting and updating information for the learned knowledge; and
   generating the learned knowledge based on the user's rejection.

6. The method as claimed in claim 5 further comprising:
   identifying a selection type of the single selection as a keyword, or a category of interest to the single selection; and
   wherein:
   generating the destination includes filtering potential destinations based on the selection type.

7. The method as claimed in claim 5 further comprising:
   managing the prioritization and the learned knowledge based on a user profile; and
   wherein generating the destination includes generating the destination based on the user profile.

8. The method as claimed in claim 5 further comprising:
   identifying a selection type of the single selection;
   filtering potential destinations based on the selection type; and
   wherein generating the destination includes:
   selecting the destination from the potential destinations.

9. The method as claimed in claim 5 wherein creating the prioritization includes creating the prioritization and the learned knowledge through a manual input.

10. A navigation system comprising:
    a user interface for receiving a single selection for a desired item with the single selection for representing a one-click performed by a user;
    a control unit, to the user interface, for:
    generating a destination for the desired item with a prioritization and a learned knowledge for representing a pattern of user's collected activities for improving an accuracy of the destination generated;
    calculating a route to the destination based on the single selection for displaying the route on a device using the single selection without other entries for the desired item or for the route before displaying the route; and
    creating a reprioritization based on a change in the pattern for the user's activities, the reprioritization for controlling a frequency of controlling collecting and updating information for the learned knowledge.

11. The system as claimed in claim 10 wherein the control unit is for creating the reprioritization including setting a level for collecting and updating information based on a minimal threshold for the learned knowledge or based on a frequency for representing the user's activity.

12. The system as claimed in claim 10 wherein the control unit is for:
    creating the prioritization based on a preference of the user's behavior; and
    generating the learned knowledge based on the prioritization.

13. The system as claimed in claim 10 wherein:
    the user interface is for receiving a user's rejection for the route; and
    the control unit is for generating the learned knowledge based on the user's rejection.

14. The system as claimed in claim 10 wherein:
    the user interface is for receiving a user's rejection for the route;

the control unit is for:
- creating the prioritization based on a preference of the user's behavior; and
- generating the learned knowledge based on the user's rejection and the prioritization.

15. The system as claimed in claim 14 wherein the control unit is for identifying a selection type of the single selection as a keyword, or a category of interest to the single selection to filter potential destinations.

16. The system as claimed in claim 14 wherein the control unit is for:
- managing the prioritization and the learned knowledge based on the user profile; and
- generating the destination based on the user profile.

17. The system as claimed in claim 14 wherein the control unit is for:
- identifying a selection type of the single selection to filter potential destinations; and
- selecting the destination from the potential destinations.

18. The system as claimed in claim 14 wherein the control unit is for creating the prioritization and the learned knowledge through a manual input.

\* \* \* \* \*